United States Patent Office 3,528,935
Patented Sept. 15, 1970

3,528,935
PACKAGE STABLE, LOW VISCOSITY, HIGH SOLIDS, THERMOSETTING COATING COMPOSITIONS WITH LATENT CURING CATALYST
Donald L. Marion, Homewood, Robert H. Hall, Park Forest, and William C. Rusnack, Harvey, Ill., assignors to Sinclair Research, Inc., New York, N.Y., a corporation of Delaware
No Drawing. Filed Nov. 30, 1967, Ser. No. 686,849
Int. Cl. C08g 30/12, 45/04
U.S. Cl. 260—23                                                26 Claims

ABSTRACT OF THE DISCLOSURE

Low viscosity, high solids, thermosetting coating compositions are obtained by incorporating in an inert solvent, an alkanol half-ester, preferably isooctyl half-ester, of a low molecular weight styrene-maleic anhydride copolymer, a low molecular weight epoxy resin, such as a glycidyl ether of bisphenol-A, the ratio of epoxide equivalents to anhydride equivalents in the coating composition being about 2:1 to 1:1.25 g. and a zinc organic acid salt, such as zinc octoate, in a small amount, effective as a latent curing catalyst, such as about .05 to 1% zinc metal by weight of the total non-volatile resins. The package stability of the coating composition at ambient temperature is a number of months, often greater than six months. These coatings have excellent adherence to metal.

---

This invention relates to thermosetting coating compositions containing a partial ester of a styrene-maleic anhydride copolymer and an epoxide resin. More particularly this invention relates to package stable, low viscosity, high solids, thermosetting coating compositions containing in a solvent, a half-ester of a styrene-maleic anhydride copolymer, an epoxide resin and a latent curing catalyst.

The reaction of carboxyl and anhydride functional polymers and monomeric anhydrides with epoxide resins is extensively reported in the patent and technical literature. Resin systems of this type are used commercially for various purposes, such as coatings for metal, laminates and encapsulants. Curing of the resin composition is generally accomplished in conjunction with a catalyst or at an elevated temperature or more commonly by a combination of both. Some of the catalysts cited in the literature are tertiary amines, quaternary ammonium compounds and Lewis acids, such as boron trifluoride complexes. Materials such as these are effective for promoting the curing reaction. However, after the resin composition is catalyzed, reaction can occur at ambient conditions at variable rates, and the viscosity of the system increases until gelation occurs, sometimes in as little as a few hours or even minutes. This is a severe commercial limitation, particularly in the coatings field, since the applicator desires that the coating be in useable condition for several months as received from the coatings' manufacturer. In addition, the concept of "two-package" systems whereby the catalyst is mixed into the coating shortly before application, has not received widespread acceptance, and therefore does not consitute acceptable practice.

It has now been discovered in accordance with the present invention that low viscosity, high solids, thermosetting coating compositions which are package stable at ambient temperatures and curable by baking for a short period of time at an elevated temperature are obtained by dispersing or dissolving in an inert aromatic hydrocarbon solvent or in a blend of an inert aromatic hydrocarbon solvent and an oxygenated solvent, a partial ester of a low molecular weight styrene-maleic anhydride copolymer esterified with an alkanol to about 75 to 100% half-ester, a zinc organic acid salt in a small amount, effective as a latent curing catalyst, and a low molecular weight epoxy resins, with the ratio of epoxide equivalents of the epoxy resin to anhydride equivalents of the partial ester in the coating composition being about 2:1 to 1:1.25.

The styrene-maleic anhydride copolymer which is esterified to the half-ester has a molar ratio of styrene to maleic anhydride of about 1:1 to 10:1, often about 3:1 to 5:1, and preferably about 4:1, the molecular weight of the copolymer being about 500 to 4000, often about 1400–3000, and preferably about 2000–3000.

Styrene and maleic anhydride can be polymerized to form resins for use in this invention by conventional polymerization methods. Solution polymerization methods can be employed where the monomers are polymerized in a suitable solvent using as a polymerization catalyst a free-radical catalyst, such as benzoyl peroxide or dicumyl peroxide, at a temperature of about 75 to 300° C. or more. Suitable solvents include the aromatic hydrocarbon solvents, such as cumene, p-cymene, xylene, toluene, and the like.

By adjusting the monomer ratios of styrene to maleic anhydride, the resulting copolymer can contain a molar ratio of polymerized styrene to polymerized maleic anhydride of about 1:1 to 10:1 and can have an average molecular weight of about 500 to 4000, preferably about 2000 to 3000. A mole ratio of styrene to maleic anhydride of 3:1 to 5:1, such as about 4:1, is preferred with a molecular weight of about 1400 to 2000 up to 3000.

The partial esters of these styrene-maleic anhydride resins can be prepared for use in this invention in a conventional manner from alkanols of about 3 to 20 carbon atoms, preferably of 6 to 18 carbon atoms, such as $C_8$ alkanols, i.e., octanol and its isomers, particularly isooctanol including isomeric mixtures thereof. The partial esters are preferably the half-esters of about 75 to 100% half-ester and most preferably about 90 to 100% half-ester. Although alkanols of about 3 to 20 carbon atoms can be used instead of isooctyl alcohol for partial esterification to half-esters of the styrene-maleic anhydride copolymers, the $C_8$ alkanols are preferred. These $C_8$ alkanols include octanol, isooctanol and isomeric mixtures thereof, such as mixtures of dimethyl-hexanols and methyl-heptanols. A commercially available isooctyl alcohol contains by weight about 20% 3,4-dimethyl-1-hexanol, 30% 3,5-dimethyl-1-hexanol, 30% 4,5-dimethyl-1-hexanol, and 15% 3- and 5-methyl-1-heptanol. Preferably, the styrene-maleic anhydride copolymer is esterified with isooctyl alcohol including isomeric mixtures thereof, often to about 75 to 100% half-ester, and preferably to about 90 to 100% half-ester. Such isooctyl partial ester of a styrene-maleic anhydride copolymer having about a 4:1 molar ratio of styrene to maleic anhydride, being esterified to about 90 to 100% half-ester, and having a molecular weight of about 2000–2400 is most preferred.

The zinc organic acid salt, preferably a zinc $C_8$ alkanoic acid salt, such as zinc octoate, is often employed as an 8% solution, based on the zinc metal, in odorless mineral spirits. Only a small, effective amount is required, such as about .05 to 1% and preferably about .05 to .2%, zinc metal based on the weight of the total non-volatile resins in the coating composition, i.e., on the total weight of the non-volatile resins in both the styrene-maleic anhydride half-ester and in the epoxy resins. While more zinc organic acid salt can be used than 1% zinc metal, based on the weight of the total non-volatile resins, it is not necessary for optimum results. Excess zinc organic acid salt, such as excess zinc octoate, reduces package stability and may produce undersirable effects in the baked coating.

Zinc salts of organic acids, other than octanoic acid and its isomers, which are soluble or miscible in the coating solution can be used. Thus zinc salts of organic acids of up to 24 carbon atoms may be used, such as zinc salts of naphthenic acids, rosin acids, 2-ethylhexanoic acid, linseed fatty acid, tall oil fatty acids, alpha,alpha,alpha-trisubstituted acetic acids (neo acids) and other fatty acids, saturated and unsaturated. Other metal organic salts which are good curing catalysts do not have the package stability which is unique in zinc organic acid salts, particularly in zinc octoate.

Epoxide resins are well known in the art, such as, Shell Chemical Company's "Epon" resins, the glycidyl ethers of bisphenol-A (para,para'-isopropylidenediphenol), i.e., the condensation products of epichlorohydrin and para, para'- isopropylidenediphenol, the cycloaliphatic epoxide resins, the epoxidized novolac resins, the epoxidized oils, such as epoxidized soybean oil, and epoxidized phenol formaldehyde resins. The lower molecular weight liquid epoxide resins are preferred, such as the liquid epoxide resins of glycidyl ethers of Bisphenol-A but higher molecular weight solid expoxide resins can be used in solvents, and in admixture with the low molecular weight liquid epoxide resins.

Epoxide resins are available with epoxy equivalent weight, often in the range of about 140–1025 and even from about 100 to 2000 up to about 6000, with the molecular weight often about double the epoxy equivalent weight. Any epoxide resin, whether liquid or solid, which is compatible in solution with the styrene-maleic anhydride half-ester can be used.

Among the lower molecular weight epoxide resins suitable for use in this invention are the following Shell Chemical Company's "Epon" resins:

| | Physical state | Molecular weight average | Epoxide equivalent weight |
|---|---|---|---|
| "Epon" resin: | | | |
| 812 | Liquid | 306 | 140–160 |
| 815 | do | 330 | 175–195 |
| 820 | do | 350 | 180–195 |
| 826 | do | | 180–188 |
| 828 | do | 380 | 185–192 |
| 830 | do | | 190–210 |
| 834 | do | 470 | 230–280 |
| 836 | M.P. 40–45° C. | | 290–335 |
| 871 | Liquid | | 390–470 |
| 872 | do | | 650–750 |

The following normally solid "Epon" resins may also be used in solvents and in admixture with liquid "Epon" resins:

"Epon 864" is a normally solid resin melting at about 40–50° C., has an epoxide equivalent of about 300–375 and a molecular weight of about 700.

"Epon 1001" is a normally solid resin melting at 64–76° C., has an epoxide equivalent of about 450–550 with an average molecular weight of 900–1000.

"Epon 1004" is a solid resin melting at 95–105° C., has an epoxide equivalent of about 810–1025, with an average molecular weight of about 1400.

The ratio of epoxide equivalents of the epoxy resin to anhydride equivalents of the partial ester in the coating composition can be about 2:1 to 1:1.25, and is often about 1.40/1.00 to 1.00/1.15. However, it is preferred to employ a ratio of expoxide equivalents to anhydride equivalents in the coating composition in excess of 1/1 up to about 1.16/1.

The low molecular weight epoxide resins, such as the "Epon" resins, having an epoxide equivalent weight within the range of about 140–750, preferably 175–300, and an average molecular weight within the range of about 300 to about 1500 and preferably about 300 to 500 are in general compatible with the partial esters of styrene-maleic anhydride copolymers dissolved in an inert aromatic hydrocarbon solvent, such as xylene, toluene, benzene and ethylbenzene or in a blend of an inert aromatic hydrocarbon solvent and an oxygenated solvent, such as alcohols, e.g., n-butanol, sec. butanol, isobutanol, n-propanol, isopropanol; ketones, e.g., methyl isobutyl ketone; esters, e.g., ethylene glycol monoethyl ether acetate; and ethers, e.g., ethylene glycol monomethyl ether. A ratio of inert aromatic hydrocarbon solvent to oxygenated solvent of 100/0% to 20/80% can be used, and 90/10% to 40/60% or even to 20/80% by weight is preferred, based on the total solvent in the coating composition. The blend with the oxygenated solvent imparts greater stability to the solution, although the aromatic hydrocarbon solvent can be used alone.

Where the epoxide resin is normally solid of higher molecular weight and is not compatible with the partial ester of styrene-maleic anhydride, compatibility often can be achieved by dissolving the solid epoxide resin in an oxygenated solvent, such as ethylene glycol monoethyl ether acetate, or in blends with aromatic hydrocarbons, and including therein a lower molecular weight liquid epoxy resin. Thus compatible vehicle combinations of "Epon 828"/"Epon 1004"/isooctyl half-ester of styrene-maleic anhydride copolymer are obtained in epoxide equivalent/carboxyl equivalent ratios of 1.11/0.05/1.00 and 1.01/0.15/1.00. The solution composition and baked film compatibility are excellent and such coatings exhibit improved flexibility. With "Epon 828"/"Epon 1001"/isooctyl half-ester of styrene-maleic anhydride copolymer, a compatible vehicle composition of epoxide to carboxyl ratio has been obtained at .74/0.39/1.00.

The coating compositions of this invention can include other additives such as pigments, fillers, plasticizers, anti-silking compounds, and the like. Illustrative examples of pigments which can be used in the coating compositions of this invention are titanium dioxide, cadmium red, carbon black, light chrome green, iron blue, ultramarine blue, furnace black, and other conventional pigments. The pigment to binder ratio is often about 1:1, such as 0.9:1 or 1:1.2, but can be varied as desired.

A desirable characteristic of an organic coating is a high level of solids, e.g., pigment and vehicle, per unit volume. This is of significance to the coatings' applicator since the coating solids and viscosity characteristics determine to a major degree the time and method by which a coating can be applied. For example, if a coating is applied by spray, fewer passes with a spray gun are required to deposit a film of given thickness with a higher solids coating than with one containing lower solids. Of equal importance is the cost of the coating solvent. The solvent functions as the carrier for the pigment and vehicle, and after deposition the solvent is volatized from the film. Coatings with higher solids and with viscosity characteristics suitable for spray application are economically attractive because of reduced solvent content and lower associated cost.

Formulation of low viscosity, high solids, styrenemaleic anhydride partial ester-epoxide resin coating compositions of this invention can be accomplished by solubilization in a blend of the aromatic hydrocarbon solvent, such as xylene, and an oxygenated solvent, preferably ethylene glycol monomethyl ether, or butanol, e.g., n-butanol or 2-butanol. Thus coating compositions of this invention with high solids contents of at least about 50%, preferably about 50 to 75%, such as about 58%, can be obtained. Such coating compositions often have a low viscosity which is suitable for spray application, for example of about 18–20 seconds, measured by a No. 4 Ford Cup at 77° F.

Coating compositions of this invention containing a small, effective amount of zinc octoate as a latent curing catalyst, exhibit excellent package stability over extended storage intervals of up to over six months. However, baking these coatings at a temperature of 300–350° F. initiates catalytic activity so that the coatings become thermoset to hard films with baking cycles normally used in the coatings industry of, for example, about 30 minutes. The small amount of zinc octoate latent curing catalyst is not reactive in the coating compositions of this invention at ambient temperatures but readily initiates the crosslinking reaction between the epoxy resin and the styrene-maleic anhydride partial ester after the coating is applied and on baking at elevated temperatures, and for a short period of time, such as at 300 to 350° F., preferably at 350° F. for about 30 minutes.

The following examples illustrate various embodiments of this invention and include preferred embodiments thereof. In these examples the isooctyl half-ester of styrene-maleic anhydride copolymer is about 95% half-ester having a 4:1 mole ratio of styrene to maleic anhydride and the half-ester has a molecular weight of 2100–2400.

EXAMPLE I

Various metal organic acid salts were added to solutions of an isooctyl half-ester of a styrene-maleic anhydride copolymer and a low molecular weight liquid epoxide, a glycidyl ether of bisphenol-A which can be made by condensing epichlorohydrin and bisphenol-A (Shell Chemical Company's "Epon 828"). The basic resin coating composition was prepared by mixing the isooctyl half-ester of the styrene-maleic anhydride copolymer at 45% non-volatile residue (NVR) in xylene, with the liquid epoxide resin, and with xylene in the following parts by weight.

| | Parts by weight |
|---|---|
| Isooctyl half-ester of styrene-maleic anhydride copolymer (45% NVR) in xylene | 744 |
| Liquid epoxide resin ("Epon 828") | 166 |
| Xylene | 340 |
| Total | 1250 |

The ratio by weight of isooctyl half-ester of the styrene-maleic anhydride copolymer to the "Epon 828" resin in this basic coating composition was 67/33 and the combined resins were dissolved in xylene to 40% resin content.

The styrene-maleic anhydride copolymer prior to esterification had an acid number range of approximately 190–205 as given in mg. KOH/gm. sample.

The typical physical properties of the isooctyl half-ester of the styrene-maleic anhydride copolymer are:

| | |
|---|---|
| Acid number | 105±10 |
| Melting point, ° C | 98–118 |
| Molecular weight (by osmometry) | 2100–2400 |
| Solution viscosity (25° C.)— | |
| 40% NVR in xylene poises | 40–75 |
| 50% NVR in a 35/15 solvent blend of xylene/ethylene glycol monomethyl ether poises | 2.10–2.50 |
| APHA color, 50% NVR in a 35/15 solvent blend of xylene/ethylene glycol monomethyl ether | 60–100 |

The liquid epoxide resin ("Epon 828") has the following typical physical properties:

| | |
|---|---|
| Epoxide equivalent weight | 185–192 |
| Gardner color maximum | 4 |
| Viscosity (25° C.) poises | 100–160 |

Films of this basic resin coating composition with and without various metal organic acid salts as curing catalyst in the coating solutions were cast on steel panels by means of a Bird applicator and baked for 30 minutes at 350° F. The degree of cure, i.e., the extent of reaction which occurred during baking, was evaluated by determining the solvent resistance and the impact resistance of the films. Resistance of the films to solubilization by xylene, the solvent from which the coatings were applied, was used as a qualitative measure to determine if the films were thermoset. Distinction in the degree of cure also was qualitatively assessed by spotting the films with acetone, a stronger solvent than xylene. Films which resisted attack by acetone were considered to be more effectively crosslinked than films which resisted only xylene.

In conjunction with solvent resistance, the extent of cure also was evaluated by determining the flexibility of the films. Films which are not cured are very brittle and exhibit limited impact resistance. In general, flexibility approaches a higher value as the degree of cure reaches an optimum point.

Performance data for these coatings are summarized in Table 1. These data illustrate that the coatings catalyzed with zinc octoate, calcium octoate and calcium naphthenate exhibited significantly improved solvent resistance and flexibility in comparison to an uncatalyzed coating and to coatings catalyzed with other metal organic acid salts.

EXAMPLE II

Accelerated package stability tests were conducted by placing samples of the coating compositions of Example I containing various metal organic acid salts as curing catalysts in an oven maintained at 130° F. Stability was determined by periodically measuring the solution viscosities of the coating solutions. Data summarized in Table 2 show that the coating solutions did not undergo gelation for periods ranging from a minmum of a few days to thirty-one days, at which time testing was discontinued. Resin solutions containing metal salts which were more effective in promoting the curing reaction, as indicated by solvent resistance and flexibility, generally exhibited a faster rate of viscosity increase. However, the combined properties of optimum performance and package stability were demonstrated best in the solutions containing zinc octoate as the latent curing catalyst.

EXAMPLE II-A

To provide comparative performance data, coating compositions were prepared in xylene of the isooctyl half-ester of the styrene-maleic anhydride copolymer and the "Epon 828" resin of Example I. Three pairs of coating compositions were prepared in which the ratio of epoxide equivalents to anhydride equivalents were respectively 1.00/1.15; 1.00/1.00; and 1.15/1.00. To one coating composition of each pair, test Nos. 2, 4 and 6, benzyldimethylamine was added as a catalyst. Coatings were applied to steel panels and baked 30 minutes at 350° F. Coating performance as related to solvent resistance was inferior to similar coatings catalyzed with zinc octoate. Impact resistance of the benzyldimethylamine catalyzed coatings was equivalent to the similar coatings catalyzed with metal organic acid salts.

When the amine catalyzed coating compositions were tested for stability at 130° F., gelation occurred in a period between one and four days. Solutions stored at ambient conditions gelled after approximately four weeks. Uncatalyzed samples showed little viscosity increase after 54 days' storage but the coatings were very inferior, tests Nos. 1, 3 and 5. These data are summarized in Table 3 and demonstrate lack of package stability. In comparison, the improvement in performance, especially in regard to package stability, which is obtained by the use of zinc octoate as the latent curing catalyst is shown by comparison with the data in Table 2.

EXAMPLE III

A pigmented coating composition was prepared with the isooctyl half-ester of styrene-maleic anhydride copolymer and "Epon 828" resin of Example I in xylene and with titanium dioxide as the pigment. The formulation of this pigmented coating composition was as follows:

| | Parts by weight |
|---|---|
| Titanium dioxide | 250 |
| Isooctyl half-ester styrene-maleic anhydride copolymer (40% NVR) in xylene | 111 |
| Xylene | 111 |
| Isooctyl half-ester styrene-maleic anhydride copolymer (40% NVR) in xylene | 306.2 |
| "Epon 828" | 83 |
| Xylene | 109.2 |
| Total | 970.4 |
| Total non-volatile material, percent | 51.5 |
| Percent of non-volatile material | 50.0 |
| Percent resin of non-volatile material | 50.0 |
| Pigment/binder ratio | 1.0/1.0 |
| Epoxide equivalents/anhydride equivalents ratio | 1.15/1.00 |

Samples of this pigmented coating composition were catalyzed with zinc octoate, calcium octoate, aluminum naphthenate and lithium naphthenate. Data presented in Table 4 indicate the excellent viscosity stability of some of these pigmented coating compositions, particularly those containing zinc octoate.

The pigmented coating compositions were applied to steel panels and baked for periods of 30 minutes at 350° F. Coatings containing zinc octoate were also baked for 30 minutes at 300° F., and 325° F. The effectiveness of zinc octoate catalyst is demonstrated by the significant improvement in solvent resistance and flexibility in comparison to a coating of this composition without a catalyst and with most of the other metal organic salt catalysts.

EXAMPLE IV

Two pigmented coating compositions were prepared with the isooctyl half-ester of styrene-maleic anhydride copolymer and "Epon 828" resin of Example I in xylene and with titanium dioxide as the pigment. The formulation of these pigmented coating compositions were as follows:

| | Parts by weight | |
|---|---|---|
| | 1 | 2 |
| Coating composition: | | |
| Titanium dioxide | 250 | 250 |
| Isooctyl half-ester styrene-maleic anhydride copolymer (40% NVR) in xylene | 111 | 111 |
| Xylene | 131 | 131 |
| Disperse to a 7+ Hegman reading, then add: | | |
| Isooctyl half-ester styrene-maleic anhydride copolymer (40% NVR) in xylene | 332 | 306.2 |
| "Epon 828" | 72.8 | 82 |
| Xylene | 76.6 | 97 |
| Total | 973.4 | 977.2 |
| Total non-volatile material | 51.4% | 51.0% |
| Percent pigment of non-volatile | 50.0 | 50.0 |
| Percent resin of non-volatile | 50.0 | 50.0 |
| Pigment/binder ratio | 1.0/1.0 | 1.0/1.0 |
| Epoxide equivalents/anhydride equivalents ratio | 1.16/1.0 | 1.40/1.0 |

Zinc octoate as a latent curing catalyst was added to samples of each of these coating compositions in amounts respectively of 0.10 (tests Nos. 1–A and 2–A) and 0.20 (tests Nos. 1–B and 2–B) percent zinc based on non-volatile resins in the coating compositions. Samples of each of these pigmented coating compositions with and without the zinc octoate (tests 1 and 2) were stored at ambient conditions and viscosity determined at 25° C. periodically over a period of more than six months. The data summarizing long term viscosity stability of these pigmented coating compositions with zinc octoate as a latent catalyst are presented in Table 5. These data show that these pigmented styrene-maleic anhydride half ester-epoxide coatings with zinc octoate as a latent curing catalyst have a useable shelf life of at least six months when stored at ambient conditions. Stability of this duration is well within the specifications of most industrial coatings' applicators.

EXAMPLE V

A pigmented coating composition was prepared with the isooctyl half-ester of styrene-maleic anhydride copolymer and "Epon 828" resin of Example I in xylene and with titanium dioxide as the pigment according to the following formulation:

| | Parts by weight |
|---|---|
| Titanium dioxide | 250 |
| Isooctyl half-ester styrene-maleic anhydride copolymer (43% NVR) in xylene | 111 |
| Xylene | 131 |
| Disperse to a 7+ Hegman reading, then add: | |
| Isooctyl half-ester styrene-maleic anhydride copolymer (43% NVR) in xylene | 302.2 |
| "Epon 828" | 72.8 |
| Xylene | 106.8 |
| 10% Raybo 3* in xylene | 5.0 |
| Total | 978.8 |
| Total non-volatile material, percent | 51.1 |
| Percent pigment of non-volatile | 50.0 |
| Percent resin of non-volatile | 50.0 |
| Pigment/binder ratio | 1.0/1.0 |
| Epoxide equivalents/anhydride equivalents ratio | 1.16/1.00 |

*Commercial volatile liquid for reducing silking and floating in paints obtained from Raybo Chemical Cos., Huntington, W.Va.

Zinc octoate as a latent curing catalyst was added to test samples 1–A and 1–B of this pigmented coating composition in amounts respectively of 0.10 and 0.20 percent zinc based on non-volatile resins in the coating composition. The initial viscosity at 77° F. and at the end of each month for three months is given in Table 6 for each of the coating composition test samples with zinc octoate and also for a coating composition, test sample 1, without the zinc octoate catalyst. A comparison of these viscosity data shows that the viscosity at ambient temperature over a period of three months remains excellent and that the curing effect of zinc octoate is latent. Detailed performance characteristics of the zinc octoate catalyzed coatings are summarized in Table 6 on coating composition test samples 1–A and 1–B baked for 30 minutes at 350° F. and on coatings 1–B baked for 20 minutes at 350° F. and 30 minutes at 325° F. The flexibility, impact resistance, detergent resistance, corrosion resistance, hardness and stain resistance of these coatings indicated that they are suitable for use as a premium quality coating for metal substrates.

EXAMPLE VI

Solutions of isooctyl half-ester of styrene-maleic anhydride copolymer in solvent compositions containing an aromatic hydrocarbon solvent and an oxygenated solvent have been found to exhibit extremely low viscosity characteristics. Typical viscosity characteristics for solutions of this type of isooctyl half-ester of styrene-maleic anhydride copolymer are illustrated in Table 7.

Four solutions of isooctyl half-ester of styrene-maleic anhydride copolymer were prepared as follows:

RATIO OF COMPONENTS BY WEIGHT

| | Solution No. | | | |
|---|---|---|---|---|
| | 1 | 2 | 3 | 4 |
| Isooctyl half-ester styrenemaleic anhydride copolymer | 50 | 50 | 50 | 50 |
| Xylene | 30 | 30 | 40 | 35 |
| Sec.-butanol | 20 | 20 | | |
| Ethylene glycol monomethyl ether | | | 10 | 15 |

Pigmented coating compositions formulated with these solutions and "Epon 828" with zinc octoate as latent curing catalyst, designated respectively test numbers 1, 2, 3, and 4, have been found to exhibit low viscosities at high coating solids. Examples of stable, high solids, coatings formulated with these low viscosity resin solutions are summarized in Table 8.

It is common practice in the coating industry that a coating is manufactured at a solids content of 50–60%, and at a viscosity, for example of 40–70 seconds, as measured by a No. 4 Ford Cup. Additional solvent must be added at the coating site so that the coating will have viscosity characteristics suitable for application. For example, coating viscosity for spray application is in the range of 16–20 seconds, as measured by a No. 4 Ford Cup. The coating compositions formulated with the aromatic hydrocarbon solvent and the oxygenated solvents in Table 8 demonstrate that very high solids coatings can be obtained with isooctyl half-ester styrene-maleic anhydride copolymers and "Epon 828" resin pigmented with titanium dioxide and containing zinc octoate as a latent curing catalyst and that these high solids coatings can be obtained with viscosity characteristics suitable for spray application with very little or without any additional solvent modification.

EXAMPLE VII

A thermosetting appliance enamel was prepared with an isooctyl 95% half-ester of styrene-maleic anhydride copolymer (4:1 mole ratio of styrene to maleic anhydride) and "Epon 828" in xylene/ethylene glycol monomethyl ether with titanium dioxide pigment and zinc octoate as latent curing catalyst and subjected to viscosity and stability tests. The formulation and results of tests are as follows:

| | Parts by weight |
|---|---|
| Titanium dioxide | 300 |
| Isooctyl half-ester styrene-maleic anhydride copolymer (50% NVR) in 80/20 xylene/ethylene glycol monomethyl ether | 100 |
| Xylene | 70 |
| Disperse in a ball mill to a 7+ Hegman reading, then add: | |
| Isooctyl half-ester styrene-maleic anhydride copolymer (50% NVR) in 80/20 xylene/ethylene glycol monomethyl ether | 326 |
| "Epon 828" | 87 |
| Xylene | 142.3 |
| 8% zinc octoate | 7.5 |
| Raybo 3 | 0.5 |
| Total | 1033.3 |

| | |
|---|---|
| Baking schedule | 30–350° F. |
| Viscosity (seconds, No. 4 Ford Cup at 77° F.) | 20". |
| Pigment/binder ratio | 1.0/1.0. |
| Non-volatile material | 58.1%. |
| Pigment | 50.0%. |
| Vehicle | 50.0%. |
| Vehicle composition (weight percent) isooctyl half-ester styrene-maleic anhydrid polymer/"Epon 828" | 71.0/29.0. |
| Epoxide/carboxyl equivalents ratio | 1.10/1.00. |
| Percent zinc metal (based on resin solids) Package stability | 0.20. |
| Viscosity after storage at ambient conditi (seconds No. 4 Ford Cup at 77° F.)— | >6 months. |
| 4 weeks | 22". |
| 8 weeks | 28". |
| 12 weeks | 31". |
| 16 weeks | 33". |
| Accelerated viscosity stability at 130° F.; weeks until gelation | 7. |

The coating viscosity at 58% total solids is suitable for spray application without further solvent reduction. This provides faster film build and minimizes the cost of reducing solvents. There is excellent pigment suspension characteristics. The data shows that there is minimal viscosity change with long term coating storage. This coating composition when spray coated on metal appliances and baked for 30 minutes at 350° F., has excellent adhesion to the steel as well as to primer surfaces. As an appliance top coat enamel, the coating has high gloss with excellent image reflection. Based on performance data, the coating has excellent detergent and corrosion resistance, exceptional chemical resistance and is non-sensitive to common household stains.

Performance data shows that:

(1) No blistering or loss of gloss after 500 hours exposure in 1% "Tide" solution at 165° F.

(2) Only approximately 1/16" corrosion creepage at scribe markings after 500 hours exposure in 5% sodium chloride fog at 95° F. and 100% relative humidity.

(3) Excellent chemical resistance after long term exposure at 160° F. to acids, alkali, carbon tetrachloride and sodium hypochlorite. These results far surpassed the performance of a thermosetting acrylic coating.

(4) No staining after 24 hours contact with mustard, ketchup, ink, grape juice, lipstick or Mercurochrome.

(5) Excellent solvent release, high gloss, good film hardness and mar resistance. When the film is overbaked for 7 hours at 350° F. there is still excellent color retention.

In addition to regulating the solvent evaporation rate and providing low viscosity of the half-ester-"Epon" resin coating composition, it has been discovered that selection of oxygenated solvents, particularly 2-butanol and ethylene glycol monomethyl ether, which are preferred, in certain proportions to the aromatic hydrocarbon solvent, preferably xylene, improves the coating composition stability.

Coating formulations were prepared basically the same as herein set forth with the isooctyl half-ester of styrene-maleic anhydride copolymer and "Epon 828" resin, titanium dioxide pigment with pigment-binder ratio of 1.0/1.0 and zinc octoate catalyst concentration of 0.2% zinc based on total resin solids. The solvent composition and percentage of aromatic to oxygenated solvent were varied and the effects on initial viscosity, No. 4 Ford Cup at 77° F. and coating composition stability under accelerated storage conditions at 130° F. are tabulated as follows:

| Isooctyl half-ester styrene-maleic anhydride copolymer percent NVR in solvent composition | Coating composition percent NVM | Initial viscosity, seconds | Weeks storage at 130° F. until gelation |
|---|---|---|---|
| 40% in xylene | 51.3 | 40 | 4 |
| Do | 55.0 | 60 | 3 |
| Do | 58.5 | 79 | 2–3 |
| 50% in 80/20 xylene, "Methyl Cellosolve"[1] | 58.1 | 20 | 7 |
| 50% in 70/30 xylene "Methyl Cellosolve"[1] | 58.1 | 18 | >10 |
| 50% in 60/40 xylene/2-butanol | 58.1 | 18 | >12 |

[1] "Methyl Cellosolve" is ethylene glycol monomethyl ether.

EXAMPLE VIII

Higher epoxide equivalent weight resins, such as "Epon 1001," which are not compatible with the isooctyl half-ester of styrene-maleic anhydride copolymer, can be made compatible by including a liquid lower epoxide equivalent weight resin, such as "Epon 828," in the coating formulation. "Epon 1001" has an epoxide equivalent weight of about 450–550 and an average molecular weight of 900–1000. It is a solid condensation product of an epihalogenohydrin, such as epichlorohydrin, and bisphenol-A. "Epon 828" is a liquid condensation product of an epihalogenohydrin, such as epichlorohydrin, and bisphenol-A. It has an epoxide equivalent of about 185–192 and an average molecular weight of about 380. The solid "Epon 1001" resin can be dissolved in a solvent, such as ethylene glycol monoethyl ether acetate and then mixed with the other components of the coating composition. Such a coating composition which is based upon a vehicle composition of the isooctyl half-ester of styrene-maleic anhydride copolymer and the two epoxide resins, "Epon 828" and "Epon 1001," is formulated as follows and a coating thereof baked for 30 minutes at 350° C. exhibits improved flexibility.

| | Lbs. |
|---|---|
| Titanium dioxide | 300 |
| Isooctyl half-ester styrene-maleic anhydride copolymer (50% NVR) in 80/20 xylene/ethylene glycol monomethyl ether | 100 |
| Xylene | 70 |
| Disperse in a ball mill to a 7+ Hegman reading, then add: | |
| Isooctyl half-ester styrene-maleic anhydride copolymer (50% NVR) in 80/20 xylene/ethylene glycol monomethyl ether | 304 |
| Sub. total | 774 |
| "Epon 828" | 55 |
| "Epon 1001" (50% NVR) in ethylene glycol monoethyl ether acetate | 154 |
| Xylene | 62.6 |
| 8% zinc octoate | 8.35 |
| Raybo 3 | 0.5 |
| Total | 1054.45 |

| | |
|---|---|
| Viscosity (seconds No. 4 Ford Cup at 77° F.) | 34″ |
| Pigment/binder ratio | 0.9/1.0 |
| Non-volatile material, percent | 60.1 |
| Percent pigment of non-volatile material | 47.3 |
| Percent vehicle of non-volatile material | 52.7 |
| Vehicle composition, weight percent isooctyl half-ester styrene-maleic anhydride copolymer/"Epon 828"/"Epon 1001" | 60.5/16.5/23.0 |
| Equivalents ratio, epoxide/epoxide/carboxyl "Epon 828"/"Epon 1001"/isooctyl half-ester styrene-maleic anhydride copolymer | 0.74/0.39/1.00 |
| Percent zinc metal (based on resin solids) | 0.20 |

A coating of this composition with a film thickness of 1.5 mils on a 24 gauge Bonderite 1000 substrate baked for 30 minutes at 350° F. gave performance data as follows:

| | |
|---|---|
| Direct impact (in. lbs.) | 40–50. |
| Reverse impact (in. lbs.) | 10–15. |
| Mandrel flexibility | Pass ¼″. |
| 60° gloss | 92–93. |
| Pencil hardness | 2H. |

TABLE 1.— PERFORMANCE CHARACTERISTICS OF ISOOCTYL HALF-ESTER OF STYRENE-MALEIC ANHYDRIDE COPOLYMER-"EPON 828" COATINGS CATALYZED WITH METAL ORGANIC ACID SALTS

| Test No. | Metal salt | Percent metal [1] | Xylene resistance, 30 second contact | Acetone resistance, 30 second contact | Direct impact, in. lbs. |
|---|---|---|---|---|---|
| 1 | No catalyst | | Film removed | | |
| 2 | do | | | | Pass 4; Fail 6. |
| 3 | 8% Zinc octoate [2] | 0.10 | | No effect | Pass 20. |
| 4 | do | 0.20 | | do | Do. |
| 5 | 4% Calcium octoate | 0.10 | | do | Pass 16. |
| 6 | do | 0.20 | | do | Do. |
| 7 | 4% Calcium naphthenate | 0.02 | No effect | ⎫ Slight softening could be scratched with fingernail. ⎬ | ⎧ Pass 8; Fail 10. ⎫ |
| 8 | do | 0.04 | do | | ⎨ Pass 10; Fail 12. ⎬ |
| 9 | do | 0.08 | do | ⎭ | ⎩ Pass 12; Fail 14. ⎭ |
| 10 | do | 0.10 | | | |
| 11 | do | 0.12 | | | |
| 12 | do | 0.14 | | | |
| 13 | do | 0.166 | No effect | No effect | Pass 18; Fail 20. |
| 14 | do | 0.332 | do | do | Pass 14; Fail 16. |
| 15 | do | 0.664 | do | do | Do. |
| 16 | 6% Rare earth octoates [3] | 0.10 | do | | |
| 17 | do | 0.20 | do | | |
| 18 | 28% Stannous octoate | 0.10 | ⎫ Slight softening could be scratched with fingernail. ⎬ | | |
| 19 | do | 0.20 | ⎭ | | |
| 20 | 24% Lead octoate | 0.10 | | Film removed | |
| 21 | do | 0.20 | | do | |
| 22 | 6% Zirconium octoate | 0.166 | ⎫ Slight softening, could be scratched with fingernail. ⎬ | ⎧ Film softened ⎫ | Fail 2. |
| 23 | do | 0.332 | | ⎨ do ⎬ | Do. |
| 24 | do | 0.664 | ⎭ | ⎩ do ⎭ | Do. |

[1] Based on non-volatile resins.
[2] Percent designates the % of metal which is contained as metal salt in solution of odorless mineral spirits.
[3] Mixture of mainly lanthanum and cerium octoates.

TABLE 2.—VISCOSITY STABILITY OF ISOOCTYL HALF-ESTER STYRENE-MALEIC ANHYDRIDE COPOLYMER "EPON 828" COATING COMPOSITIONS CATALYZED WITH METAL ORGANIC ACID SALTS

[Viscosity after accelerated storage at 130° F. (cps. at 77° F.)]

| Test No. | Metal salt | Percent metal [1] | Initial viscosity (cps. at 77° F.) | Days | | | | | | | | | |
|---|---|---|---|---|---|---|---|---|---|---|---|---|---|
| | | | | 1 | 2 | 3 | 4 | 5 | 6 | 8 | 9 | 10 | 11 |
| 1 | 4% Calcium naphthenate | 0.02 | 152 | 120 | | | 118 | | | 160 | | | 196 |
| 2 | do | 0.04 | 152 | 120 | | | 126 | | | 190 | | | 248 |
| 3 | do | 0.08 | 158 | 140 | | | 144 | | | 346 | | | 1,550 |
| 4 | do | 0.10 | 280 | 218 | 190 | | 276 | | | 624 | 1,704 | | |
| 5 | do | 0.12 | 284 | 212 | 202 | | 326 | | | 1,160 | (2) | | |
| 6 | do | 0.14 | 278 | 200 | 214 | | 382 | | | 1,844 | (2) | | |
| 7 | do | 0.166 | 416 | 260 | 298 | | | 638 | | | | (2) | |
| 8 | do | 0.332 | 528 | 350 | 504 | | (2) | | | | | | |
| 9 | do | 0.664 | 442 | 388 | 1,140 | | (2) | | | | | | |
| 10 | 6% Zirconium octoate | 0.166 | 142 | 100 | | | 100 | | | 100 | | 116 | |
| 11 | do | 0.332 | 140 | 98 | 98 | | | 100 | | 100 | | 120 | |
| 12 | do | 0.664 | 132 | 106 | 106 | | | 110 | | | | 140 | |
| 13 | 4% Calcium octoate | 0.10 | 276 | 196 | | 286 | | | | 878 | 2,310 | | (2) |
| 14 | do | 0.20 | 236 | 184 | | 516 | | | | (2) | | | |
| 15 | 24% Lead octoate | 0.10 | 338 | 234 | | 236 | | | | 224 | 216 | | |
| 16 | do | 0.20 | 228 | 212 | | 218 | | | | 200 | 220 | | |
| 14 | 8% Zinc octoate | 0.10 | 318 | 218 | | 232 | | | | 268 | 272 | | 304 |
| 18 | do | 0.20 | 284 | 208 | | 242 | | | | 358 | 440 | | 554 |
| 19 | 6% Rare earth octoates | 0.10 | 318 | 202 | | 216 | | | | 228 | 264 | | |
| 20 | do | 0.20 | 280 | 182 | | 220 | | | | 310 | 386 | | |

| Test No. | Metal salt | Percent metal [1] | Initial viscosity (cps. at 77° F.) | Days | | | | | | | | |
|---|---|---|---|---|---|---|---|---|---|---|---|---|
| | | | | 13 | 15 | 16 | 17 | 20 | 22 | 24 | 27 | 31 |
| 1 | 4% Calcium naphthenate | 0.02 | 152 | 240 | | | | | 1,542 | | | |
| 2 | do | 0.04 | 152 | 344 | | | | | (2) | | | |
| 3 | do | 0.08 | 158 | (2) | | | | | | | | |
| 4 | do | 0.10 | 280 | (2) | | | | | | | | |
| 5 | do | 0.12 | 284 | | | | | | | | | |
| 6 | do | 0.14 | 278 | | | | | | | | | |
| 7 | do | 0.166 | 416 | | | | | | | | | |
| 8 | do | 0.332 | 528 | | | | | | | | | |
| 9 | do | 0.664 | 442 | | | | | | | | | |
| 10 | 6% Zirconium octoate | 0.166 | 142 | 118 | 124 | | | | | 170 | | |
| 11 | do | 0.332 | 140 | 124 | 142 | | | | | 228 | | |
| 12 | do | 0.664 | 132 | 144 | 198 | | | | | 470 | | |
| 13 | 4% Calcium octoate | 0.10 | 276 | | | | | | | | | |
| 14 | do | 0.20 | 236 | | | | | | | | | |
| 15 | 24% Lead octoate | 0.10 | 338 | | | | 256 | | | | | |
| 16 | do | 0.20 | 328 | | | | 258 | | | | | |
| 17 | 8% Zinc octoate | 0.10 | 318 | 384 | | 476 | | 720 | | 1,200 | 1,900 | |
| 18 | do | 0.20 | 284 | 1,260 | | 3,525 | | (2) | | | | |
| 19 | 6% Rare earth octoates | 0.10 | 318 | | | | | 576 | | | | |
| 20 | do | 0.20 | 280 | | | | | 2,820 | | | | |

[1] Based on non-volatile resins.
[2] Gelled.

TABLE 3.—PERFORMANCE CHARACTERISTICS AND VISCOSITY STABILITY OF ISOOCTYL HALF-ESTER OF STYRENE-MALEIC ANHYDRIDE COPOLYMER–"EPON 828" COATINGS CATALYZED WITH BENZYLDIMETHYLAMINE

| | Parts by weight | | | | | |
|---|---|---|---|---|---|---|
| | Test No. | | | | | |
| | 1 | 2 | 3 | 4 | 5 | 6 |
| Isooctyl half-ester of styrene-maleic anhydride copolymer (50% NVR in xylene) | 74.0 | 74.0 | 71.2 | 71.2 | 68.2 | 68.2 |
| "Epon 828" | 13.0 | 13.0 | 14.4 | 14.4 | 15.9 | 15.9 |
| Xylene | 13.0 | 13.0 | 14.4 | 14.4 | 15.9 | 15.9 |
| Benzyldimethylamine | | 0.13 | | 0.14 | | 0.16 |
| Epoxide equivalents/anhydride equivalents ratio | 1.00/1.15 | 1.00/1.15 | 1.00/1.00 | 1.00/1.00 | 1.15/1.00 | 1.15/1.0 |

Coatings were applied to steel panels and baked 30 min. at 350° F. (Baked film thickness=1.0–1.3 mils)

| | | | | N | | |
|---|---|---|---|---|---|---|
| Pencil hardness | B | F | B | F | B | F |
| Direct impact, in. lbs | <2 | 18 | <2 | 20 | <2 | 18 |
| Flexibility, mandrel bend | (1) | (1) | (1) | (1) | (1) | (1) |
| Xylene resistance, 30 second contact | (2) | (3) | (2) | (3) | (2) | (3) |
| Acetone resistance, 30 second contact | | (4) | | (4) | | (4) |
| Initial viscosity, Gardner-Holdt at 77° F | $Z_1$–$Z_2$ | Z–$Z_1$ | Y–Z | Y–Z | X+ | X+ |
| Viscosity stability after storage at 130° F., Gardner-Holdt at 77° F.: | | | | | | |
| 1 day | | $Z_2$– | | Z–$Z_1$ | | Y–Z |
| 4 days | | (5) | | (5) | | (5) |
| 29 days | $Z_1$–$Z_2$ | | Y+ | | Y– | |
| 53 days | $Z_3$ | | $Z_1$– | | Z+ | |
| 69 days | $Z_5$– | | $Z_2$– | | $Z_4$+ | |
| Viscosity stability after storage at ambient conditions, Gardner-Holdt at 77° F.: | | | | | | |
| 7 days | $Z_1$+ | $Z_1$–$Z_2$ | Y–Z | Z–$Z_1$ | X+ | Y– |
| 21 days | $Z_1$– | $Z_5$+ | Y– | $Z_5$+ | X– | >$Z_6$ |
| 27 days | $Z_1$– | >$Z_6$ | Y– | >$Z_6$ | X– | (5) |
| 28 days | | | | (5) | | |
| 30 days | | (1) | | | | |
| 54 days | $Z_2$–$Z_3$ | | Y–Z | | X+ | |

[1] Fails 1″.
[2] Film dissolved.
[3] No effect.
[4] Slight softening.
[5] Gelled.

TABLE 4.—PERFORMANCE CHARACTERISTICS AND VISCOSITY STABILITY OF PIGMENTED ISOOCTYL HALF-ESTER STYRENE MALEIC ANHYDRIDE COPOLYMER-"EPON 828" COATINGS CATALYZED WITH METAL ORGANIC ACID SALTS

| | Test No. | | | | | |
|---|---|---|---|---|---|---|
| | 1 | 2 | 3 | 4 | 5 | 6 |
| Coating composition weight | 400.0 | 100.0 | 100.0 | 100.0 | 100.0 | 400.0 |
| 8% Zinc octoate | 1.29 | 0.32 | 0.32 | 0.32 | 0.16 | 2.58 |
| 4% Calcium octoate | | | | | | |
| 1.7% Aluminum naphthenate | | | | | | |
| 1.4% Lithium naphthenate | | | | | | |
| Percent metal based on non-volatile resin | 0.10 | 0.10 | 0.10 | 0.10 | 0.05 | 0.20 |
| Initial viscosity (seconds No. 4 Ford cup) | 52 | | | | | 47 |
| Viscosity stability after storage at 130° F. (seconds. No. 4 F.C. at 25° C.): | | | | | | |
| 3 days | 37 | | | | | 37 |
| 7 days | 43 | | | | | 50 |
| 10 days | 51 | | | | | 67 |
| 12 days | 58 | | | | | 83 |
| 14 days | 70 | | | | | 109 |
| 17 days | 86 | | | | | 180 |
| 21 days | 112 | | | | | 420 |
| Viscosity stability after storage at ambient conditions (seconds, No. 4 F.C. at 25° C.): | | | | | | |
| 3 days | 55 | | | | | 48 |
| 14 days | 58 | | | | | 50 |
| 32 days | 57 | | | | | 50 |
| Baking cycle, °F | 30' x 350 | 30' x 350 | 30' x 325 | 30' x 300 | 30' x 350 | 30' x 350 |
| Solvent resistance: | | | | | | |
| Xylene | | | N.E. | N.E. | N.E. | |
| Acetone | N.E. | N.E. | | | | N.E. |
| Direct impact (in. lbs.) | [1] | [2] | [3] | [4] | [5] | [6] |
| Flexibility (180° bend) | [7] | [7] | [8] | [9] | [8] | [7] |
| Pencil hardness | 2H | 2H | F | F | H | 2H |

| | Test No. | | | | | |
|---|---|---|---|---|---|---|
| | 7 | 8 | 9 | 10 | 11 | 12 |
| Coating composition weight | 400.0 | 200.0 | 200.0 | 200.0 | 200.0 | 400.0 |
| 8% zinc octoate | | | | | | |
| 4% Calcium octoate | 4.28 | | | | | |
| 1.7% Aluminum naphthenate | | 3.04 | 6.08 | | | |
| 1.4% Lithium napthenate | | | | 3.69 | 7.38 | |
| Percent metal based on non-volatile resins | 0.17 | 0.10 | 0.20 | 0.10 | 0.20 | |
| Initial viscosity (seconds No. 4 Ford cup) | 50 | 36 | 35 | 25 | 22 | 58 |
| Viscosity stability after storage at 130° F., seconds No. 4 Ford cup: | | | | | | |
| 3 days | 64 | | | | | 39 |
| 7 days | | 61 | 242 | [10] | [10] | 43 |
| 10 days | | [11] | [11] | [11] | [11] | 48 |
| 12 days | | | | | | 54 |
| 14 days | | | | | | 58 |
| 17 days | | | | | | 74 |
| 21 days | | | | | | 77 |
| Viscosity stability after storage at ambient conditions, seconds, No. 4 F.C. at 25° C.: | | | | | | |
| 3 days | 48 | 33 | 34 | 32 | 34 | 60 |
| 14 days | 52 | [11] | [11] | [11] | [11] | 62 |
| 32 days | | | | | | 60 |
| Baking cycle, °F | 30' x 350 | 30' x 350 | 30' x 350 | 30' x 350 | 30' x 350 | 30' x 350 |
| Solvent resistance: | | | | | | |
| Xylene | | | | | | [12] |
| Acetone | N.E. | [13] | [13] | N.E. | N.E. | |
| Direct impact, in. lbs | [2] | <2 | <2 | [14] | [14] | <2 |
| Flexibility, 180° bend | [7] | [9] | [9] | [8] | [8] | [9] |
| Pencil hardness | 2H | F | F | 2H | 2H | |

[1] Pass 32.
[2] Pass 30.
[3] Pass 20.
[4] Pass 12.
[5] Pass 14.
[6] Pass 36.
[7] Slight cracking.
[8] Cracked.
[9] Film flaked off.
[10] Gelled.
[11] 9 days.
[12] Film removed.
[13] Softens film.
[14] Pass 26.
NOTE.—N.E.=No effect.

TABLE 5.—VISCOSITY STABILITY OF PIGMENTED ISOOCTYL HALF-ESTER OF STYRENE MALEIC ANHYDRIDE COPOLYMER-"EPON 828" COATING COMPOSITIONS CONTAINING ZINC OCTOATE AS A LATENT CURING CATALYST

| | Test No. | | | | | |
|---|---|---|---|---|---|---|
| | 1-A | 1-B | 1 | 2-A | 2-B | |
| Coating composition weight, grams | 1,000.0 | 1,000.0 | 1,000.0 | 1,000.0 | 1,000.0 | 1,000.2 |
| 8% Zinc octoate, grams | 3.12 | 6.24 | | 3.12 | 6.24 | |
| Percent metal based on resins nonvolatile | 0.10 | 0.20 | 0.00 | 0.10 | 0.20 | 0.00 |
| Initial viscosity, seconds No. 4 Ford cup, 25° C | 51 | 45 | 59 | 30 | 28 | 35 |
| Viscosity stability at ambient conditions, seconds, No. 4 Ford cup, 25° C.: | | | | | | |
| 46 days | 49 | 46 | 54 | 30 | 29 | 33 |
| 77 days | 51 | 47 | 56 | 30 | 30 | 33 |
| 105 days | 56 | 60 | 63 | 32 | 34 | 34 |
| 136 days | 67 | 75 | 72 | 38 | 41 | 38 |
| 166 days | 62 | 73 | 72 | 39 | 40 | 38 |
| 197 days | 79 | 94 | 81 | 42 | 46 | 43 |

TABLE 6.—VISCOSITY STABILITY AND PERFORMANCE DATA FOR ISOOCTYL HALF-ESTER STYRENE-MALEIC ANHYDRIDE COPOLYMER-"EPON 828". PIGMENTED COATINGS CATALYZED WITH ZINC OCTOATE

| | Coating Composition Test Sample | | |
|---|---|---|---|
| | 1-A | 1-B | 1 |
| Coating composition weight, grams | 978.8 | 978.8 | 978.8 |
| 8% Zinc octoate, grams | 3.12 | 6.24 | |
| Percent metal based on non-volatile resins | 0.10 | 0.20 | 0.00 |
| Initial viscosity, seconds, No. 4 Ford cup, at 77° F | 31 | 30 | 37 |
| Viscosity stability, seconds, No. 4 Ford cup at 77° F.: | | | |
| 1 month | 35 | 33 | 39 |
| 2 months | 36 | 34 | 39 |
| 3 months | 38 | 40 | 42 |

| | Coating Composition Test Sample | | | |
|---|---|---|---|---|
| | 1-A | 1-B | 1-B | 1-B |
| Baking schedule, ° F | 30' at 350 | 20' at 350 | 30' at 325 | 30' at 350 |
| Substrate | Bonderite 1000 (Phosphatized treated steel) | | | |
| Film thickness, mils | 1.5 | 1.5 | 1.5 | 1.5 |
| Acetone resistance, 30 second spot | (1) | (2) | (2) | (1) |
| Pencil hardness | H | H-2H | H-2H | 2H |
| 60° gloss | 87-88 | 87-88 | 87-88 | 87-88 |
| Direct impact, in. lbs | 16 | 18 | 16 | 24 |
| Flexibility, coating bent over 5/16" mandrel | (3) | (4) | (4) | (5) |
| Adhesion to steel | (6) | (6) | (6) | (6) |
| Stain resistance, 24 hr. contact: | | | | |
| Mustard | (7) | (7) | (7) | (7) |
| Ketchup | (7) | (7) | (7) | (7) |
| Ink | (7) | (7) | (7) | (7) |
| Grape juice | (7) | (7) | (7) | (7) |
| Lipstick | (7) | (7) | (7) | (7) |
| Mercurochrome | (7) | (7) | (7) | (7) |
| Iodine | (8) | (8) | (8) | (8) |
| Detergent resistance, 500 hr. exposure in 1% "Tide" solution at 165° F | (9) | (9) | (10) | (9) |
| Corrosion resistance, 500 hrs. exposure in 5% NaCl fog at 95° F. and 100% R.H | (11) | (11) | (10) | (11) |

[1] No effect.
[2] Slight softening.
[3] Cracking.
[4] Slight cracking.
[5] Very slight micro-cracking.
[6] Excellent.
[7] No stain.
[8] Slight stain.
[9] No blistering, loss of gloss, or corrosion creep at scribe mark, panels scribed with a razor blade through the coating and into the metal substrate.
[10] Not run.
[11] Approximately 1/8" corrosion creep at scribe mark, panels scribed with a razor blade through the coating and into the metal substrate.

TABLE 7.—VISCOSITY CHARACTERISTICS OF ISOOCTYL HALF-ESTER STYRENE-MALEIC ANHYDRIDE COPOLYMER SOLUTIONS

| | Parts by Weight | | | | | | | | | | | | | | | | | | |
|---|---|---|---|---|---|---|---|---|---|---|---|---|---|---|---|---|---|---|---|
| | Test Number | | | | | | | | | | | | | | | | | | |
| | 1 | 2 | 3 | 4 | 5 | 6 | 7 | 8 | 9 | 10 | 11 | 12 | 13 | 14 | 15 | 16 | 17 | 18 | 19 |
| Isooctyl half-ester styrene-maleic anhydride copolymer | 40 | 50 | 50 | 50 | 50 | 50 | 50 | 50 | 50 | 50 | 50 | 50 | 50 | 50 | 50 | 50 | 50 | 50 | 50 |
| Xylene | 60 | 40 | 30 | 40 | 30 | 40 | 30 | 40 | 30 | 40 | 30 | 40 | 30 | 30 | 35 | 30 | 30 | 25 | 35 |
| Sec. butanol | | 10 | 20 | | | | | | | | | | | | | | | | |
| Ethylene glycol monomethyl ether | | | | 10 | 20 | | | | | | | | | | 10 | 10 | 10 | 10 | 10 |
| N-propanol | | | | | | 10 | 20 | | | | | | | | | | | | |
| Isopropanol | | | | | | | | 10 | 20 | | | | | | | | | | |
| N-butanol | | | | | | | | | | 10 | 20 | | | | | | | | |
| Ethylene glycol monoethyl ether acetate | | | | | | | | | | | | 10 | 20 | | | | | | |
| Methyl isobutyl ketone | | | | | | | | | | | | | | 20 | | | | | |
| Mineral spirits | | | | | | | | | | | | | | | 5 | 10 | | | |
| Odorless mineral spirits | | | | | | | | | | | | | | | | | 10 | 15 | 5 |
| Viscosity (cps. at 77° F.) | 4,000 | 350 | 260 | 270 | 210 | 270 | 210 | 250 | 210 | 390 | 270 | 1,660 | 820 | 950 | 300 | 300 | 400 | 500 | 300 |

TABLE 8.—VISCOSITY CHARACTERISTICS OF PIGMENTED COATINGS WITH VARIOUS SOLVENT COMPOSITIONS

| | Parts by weight | | | |
|---|---|---|---|---|
| | Test No. | | | |
| | 1 | 2 | 3 | 4 |
| Titanium dioxide | 300 | 300 | 300 | 300 |
| Isooctyl half-ester styrene-maleic anhydride copolymer solution | 100 | 100 | 100 | 100 |
| Xylene | 30 | 30 | 70 | 70 |
| Isooctyl half-ester styrene-maleic anhydride copolymer solution | 326 | 410 | 326 | 326 |
| "Epon 828" | 87 | 105 | 87 | 87 |
| Xylene | 172.4 | 79.2 | 142.3 | 142.3 |
| Zinc octoate | 7.5 | 9.0 | 7.5 | 7.5 |
| Raybo 3 | 0.5 | 0.5 | 0.5 | 0.5 |
| Total | 1,023.4 | 1,033.7 | 1,033.3 | 1,033.3 |
| Total non-volatile material, percent | 58.8 | 63.9 | 58.0 | 58.0 |
| Percent pigment of non-volatile | 50.0 | 50.0 | 50.0 | 50.0 |
| Percent resin of non-volatile | 50.0 | 50.0 | 50.0 | 50.0 |
| Pigment/binder ratio | 1.0/1.0 | 1.0/1.2 | 1.0/1.0 | 1.0/1.0 |
| Epoxide equivalents/anhydride equivalents ratio | 1.13/1.00 | 1.14/1.00 | 1.13/1.00 | 1.13/1.00 |
| Initial viscosity, seconds, No. 4 F.C. at 77° F | 18 | 29 | 20 | 18 |
| Viscosity stability at ambient conditions, seconds, No. 4 F.C. at 77° F.: | | | | |
| 4 weeks | | | 22 | 21 |
| 6 weeks | 20 | 45 | | |
| 8 weeks | | | 28 | |
| 11 weeks | 24 | 63 | | |

It is claimed:

1. A low viscosity, high solids, thermosetting coating composition which is package stable at ambient temperatures and is readily curable by baking at an elevated temperature which comprises:
    (a) a solvent selected from the group consisting of inert aromatic hydrocarbon solvents and blends of an inert aromatic hydrocarbon solvent and an oxygenated solvent, having dispersed therein,
    (b) a partial ester of a styrene-maleic anhydride copolymer having about a 1:1 to 10:1 molar ratio of styrene to maleic anhydride, and being esterified to about 75 to 100% half ester with an alkanol of about 3 to 20 carbon atoms, the molecular weight of the unesterified copolymer being about 500 to 4000,
    (c) a low molecular weight epoxy resin compatible with said partial ester, the ratio of epoxide equivalents of the epoxy resin to anhydride equivalents of the partial ester in the coating composition being about 2:1 to 1:1.25, and
    (d) a zinc salt of a $C_8$ alkanoic acid in a small amount, effective, as a latent curing catalyst.

2. A low viscosity, high solids, thermosetting coating composition of claim 1 wherein said partial ester is a $C_8$ alkanol partial ester of a styrene-maleic anhydride copolymer having about a 3:1 to 5:1 molar ratio of styrene to maleic anhydride, said partial ester being esterified with $C_8$ alkanol to about 90 to 100% half-ester and having a molecular weight of about 2100–2400, and said zinc salt being zinc octanoate.

3. A low viscosity, high solids, thermosetting coating composition of claim 1 wherein said epoxy resin is a liquid glycidyl ether of para,para'-isopropylidenediphenol, the ratio of epoxide equivalents of the epoxy resin to anhydride equivalents of the partial ester in the coating composition being in excess of 1:1 up to about 1.16:1.

4. A low viscosity, high solids, thermosetting coating composition of claim 1 wherein said zinc salt is zinc octoate in amount of about 0.05 to 1% zinc metal based on the weight of total non-volatile resins in the coating composition.

5. A low viscosity, high solids, thermosetting coating composition of claim 2 wherein said zinc salt is zinc octoate in amount of about 0.2% zinc metal based on the weight of total non-volatile resins in the coating composition.

6. A low viscosity, high solids, thermosetting coating composition of claim 1 wherein said solvent is selected from the group consisting of xylene and blends of xylene and an oxygenated solvent selected from the group consisting of n-butanol, sec-butanol, isobutanol, n-propanol, isopropanol, methyl isobutyl ketone, ethylene glycol monoethyl ether acetate and ethylene glycol monomethyl ether.

7. A low viscosity, high solids, thermosetting coating composition of claim 2 wherein said solvent is a blend of xylene and an oxygenated solvent selected from the group consisting of ethylene glycol monomethyl ether and 2-butanol in the ratio by weight of xylene to oxygenated solvent of about 90:10% to about 20:80%.

8. A low viscosity, high solids, thermosetting coating composition of claim 1 containing a pigment.

9. A low viscosity, high solids, thermosetting coating composition of claim 8 wherein said pigment is titanium dioxide.

10. A low viscosity, high solids, thermosetting coating composition of claim 2 containing titanium dioxide as a pigment and wherein the total non-volatile material by weight in the coating composition is within the range of about 50 to 75%.

11. A low viscosity, high solids, thermosetting coating composition which is package stable at ambient temperatures and is readily curable by baking at an elevated temperature which comprises:
    (a) a solvent selected from the group consisting of xylene and blends of xylene and an oxygenated solvent selected from the group consisting of n-butanol, sec-butanol, isobutanol, n-propanol, isopropanol, methyl isobutyl ketone, ethylene glycol monoethyl ether acetate and ethylene glycol monomethyl ether, having dispersed therein,
    (b) an isooctyl partial ester of a styrene-maleic anhydride copolymer having about a 4:1 molar ratio of styrene to maleic anhydride, said isooctyl partial ester being esterified to about 90 to 100% half-ester and having a molecular weight of about 2100–2400,
    (c) a low molecular weight liquid epoxy glycidyl ether of para,para'-isopropylidenediphenol, the ratio of epoxide equivalents of the epoxy glycidyl ether to anhydride equivalents of the partial ester in the coating composition being about 1.40:1 to 1:1.15, and
    (d) zinc octoate in a small amount, effective as a latent curing catalyst.

12. A low viscosity, high solids, thermosetting coating composition of claim 11 wherein the ratio of epoxide equivalents of the epoxy glycidyl ether to anhydride equivalents of the partial ester in the coating composition is in excess of 1:1 up to about 1.16:1.

13. A low viscosity, high solids thermosetting coating composition of claim 11 wherein said zinc octoate is in amount of about 0.05 to 1% zinc metal based on the weight of total non-volatile resins in the coating composition.

14. A low viscosity, high solids, thermosetting coating composition of claim 11 wherein said zinc octoate is in amount of about 0.2% zinc metal based on the weight of total non-volatile resins in the coating composition.

15. A low viscosity, high solids, thermosetting coating composition of claim 11 wherein said solvent is a blend of xylene and an oxygenated solvent selected from the group consisting of ethylene glycol monomethyl ether and 2-butanol in the ratio by weight of xylene to oxygenated solvent of about 90:10% to 20:80%.

16. A low viscosity, high solids, thermosetting coating composition of claim 11 containing a pigment and wherein the total non-volatile material by weight in the coating composition is within the range of about 50 to 75%.

17. A low viscosity, high solids, thermosetting coating composition of claim 16 wherein said pigment is titanium dioxide.

18. A pigmented, low viscosity, high solids, thermosetting coating composition which is package stable at ambient temperatures and is readily curable by baking at an elevated temperature which comprises:
    (a) a solvent blend of xylene and an oxygenated solvent selected from the group consisting of ethylene glycol monomethyl ether and butanol in the ratio by weight of xylene to oxygenated solvent of about 90:10% to about 20:80%, having dispersed therein,
    (b) an isooctyl partial ester of a styrene-maleic anhydride copolymer having about a 4:1 molar ratio of styrene to maleic anhydride, said isooctyl partial ester being esterified to about 90 to 100% half-ester and having a molecular weight of about 2100–2400,
    (c) a low molecular weight liquid epoxy glycidyl ether of para,para' - isopropylidenediphenol having an epoxide equivalent weight of about 185–192, the ratio of epoxide equivalents of the epoxy glycidyl ether to anhydride equivalents of the partial ester in the coating composition being in excess of 1:1 up to about 1.16:1,
    (d) zinc octoate as a latent curing catalyst in amount of about 0.2% zinc metal based on the weight of total non-volatile resins in the coating composition,
    (e) a pigment, the total non-volatile material by weight in the coating composition being within the range of about 50 to about 75%.

19. A pigmented, low viscosity, high solids, thermosetting coating composition of claim 18 wherein the pigment is titanium dioxide, the total non-volatile material by weight in the coating composition is about 58%, and the viscosity of the coating composition is within the range suitable for spray application.

20. A low viscosity, high solids, thermosetting coating composition of claim 1 wherein said low molecular weight epoxy resin is a mixture of a low molecular weight solid epoxy glycidyl ether of para,para' - isopropylidenediphenol soluble in ethylene glycol monoethyl ether acetate and a low molecuar weight liquid epoxy glycidyl ether of para,para'-isopropylidenediphenol.

21. A low viscosity, high solids, thermosetting coating composition of claim 6 wherein said solvent is a blend of xylene and methyl isobutyl ketone.

22. A low viscosity, high solids, thermosetting coating composition of claim 6 wherein said solvent is a blend of xylene and ethylene glycol monoethyl ether acetate.

23. A low viscosity, high solids, thermosetting coating composition of claim 11 wherein said solvent is a blend of xylene and methyl isobutyl ketone.

24. A low viscosity, high solids, thermosetting coating composition of claim 11 wherein said solvent is a blend of xylene and ethylene glycol monoethyl ether acetate.

25. A low viscosity, high solids, thermosetting coating composition which is package stable at ambient temperatures and is readily curable by baking at an elevated temperature which comprises:
 (a) a solvent selected from the group consisting of inert aromatic hydrocarbon solvents and blends of an inert armoatic hydrocarbon solvent and an oxygenated solvent, having dispersed therein,
 (b) a partial ester of a styrene-maleic anhydride copolymer having about a 1:1 to 10:1 molar ratio of styrene to maleic anhydride, and being esterified to about 75 to 100% half ester with an alkanol of about 3 to 20 carbon atoms, the molecular weight of the unesterified copolymer being about 500 to 4000,
 (c) a low molecular weight epoxy resin compatible with said partial ester, the ratio of epoxide equivalents of the epoxy resin to anhydride equivalents of the partial ester in the coating composition being about 2:1 to 1:1.25, and
 (d) a zinc salt of an organic acid of up to 24 carbon atoms selected from the group consisting of zinc salts of naphthenic acids, zinc salts of rosin acids, and zinc salts of fatty acids in a small amount, effective as a latent curing catalyst.

26. A low viscosity, high solids, thermosetting coating composition of claim 25 wherein said zinc salt is a zinc salt of a fatty acid.

References Cited

UNITED STATES PATENTS

| | | | |
|---|---|---|---|
| 3,399,109 | 8/1968 | Zimmerman et al. | 260—837 X |
| 3,375,227 | 3/1968 | Hicks | 260—33.6 X |
| 3,002,860 | 10/1961 | Bishop et al. | 260—837 X |

FOREIGN PATENTS 903,933   8/1962   Great Britain.

DONALD E. CZAJA, Primary Examiner

C. W. IVY, Assistant Examiner

U.S. Cl. X.R.

260—18, 33.4, 33.6, 837

UNITED STATES PATENT OFFICE
CERTIFICATE OF CORRECTION

Patent No. 3528935              Dated January 14, 1971

Inventor(s) Donal L. Marion et al.

It is certified that error appears in the above-identified patent and that said Letters Patent are hereby corrected as shown below:

Dolumn 8, line 28, "Cos." should be --Co.--.

Column 9, line 48, "30" should read --30'--.

Column 9, line 59, after "solids)" insert ----0.20--.

Column 9, line 60, delete "0.20" and insert --> 6 mo.--.

Table 2., under Test No., after 16 is "14" and should be changed to read --17--.

Table 4, third line from bottom is "Direcet" should be --Direct--.

Table 5, line 1, last column should be --1,000.0--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents